US012739179B2

(12) United States Patent
Shah et al.

(10) Patent No.: US 12,739,179 B2
(45) Date of Patent: Sep. 15, 2026

(54) METHOD AND SYSTEM FOR APPLICATION SERVICE MANAGEMENT USING CLIENT FEEDBACK IN WIRELESS NETWORK

(71) Applicant: Samsung Electronics Co., Ltd., Suwon-si (KR)

(72) Inventors: Sapan Pramodkumar Shah, Bangalore (IN); Nishant Gupta, Bangalore (IN); Narendranath Durga Tangudu, Bangalore (IN); Basavaraj Jayawant Pattan, Bangalore (IN); Deepanshu Gautam, Bangalore (IN); Varadarajan Seenivasan, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 201 days.

(21) Appl. No.: 18/556,072

(22) PCT Filed: Jun. 24, 2022

(86) PCT No.: PCT/KR2022/009022
§ 371 (c)(1),
(2) Date: Oct. 18, 2023

(87) PCT Pub. No.: WO2022/270970
PCT Pub. Date: Dec. 29, 2022

(65) Prior Publication Data

US 2024/0195711 A1 Jun. 13, 2024

(30) Foreign Application Priority Data

Jun. 25, 2021 (IN) ............................ 202141028728
May 25, 2022 (IN) ............................ 202141028728

(51) Int. Cl.
*H04L 12/00* (2006.01)
*H04L 41/50* (2022.01)
(Continued)

(52) U.S. Cl.
CPC ...... *H04L 41/5067* (2013.01); *H04L 41/5009* (2013.01); *H04L 41/5032* (2013.01); *H04W 24/08* (2013.01)

(58) Field of Classification Search
CPC ............. H04L 41/5067; H04L 41/5009; H04L 41/5032; H04L 47/25; H04L 47/28; H04L 45/28; H04L 41/5019; H04W 24/08
(Continued)

(56) References Cited

U.S. PATENT DOCUMENTS 9,473,372 B1 * 10/2016 Grammel .............. H04L 67/141
10,783,498 B2 * 9/2020 Aboel-Nil ............ G06Q 10/107
(Continued)

FOREIGN PATENT DOCUMENTS

CN 111951138 A 11/2020
CN 112214338 A 1/2021
(Continued)

OTHER PUBLICATIONS

Hearing Notice dated Feb. 26, 2025, in connection with Indian Application No. 202141028728, 3 pages.
(Continued)

*Primary Examiner* — Frantz Coby

(57) ABSTRACT

The disclosure relates to a 5G or 6G communication system for supporting a higher data transmission rate. Embodiments herein provide a method for application service management using a client feedback in a wireless network (1000). The method includes receiving, by an ASM server (200) in the wireless network (1000), a VAL service experience report having information about a VAL server (300) and a plurality of information elements by an ASM client device (100) in the wireless network (1000). Further the method includes storing, by the ASM server (200), the VAL service experience report. Further the method includes analyzing, by the
(Continued)

ASM server (200), the VAL service experience report received from the ASM client device (100) and VAL service experience reports received from other ASM client devices (100) in the wireless network (1000). Further the method includes performing, by the ASM server (200), at least one corrective action based on the analysis.

10 Claims, 8 Drawing Sheets

(51) Int. Cl.
*H04L 41/5009* (2022.01)
*H04L 41/5067* (2022.01)
*H04W 24/08* (2009.01)

(58) Field of Classification Search
USPC .......................................................... 370/252
See application file for complete search history.

(56) References Cited

U.S. PATENT DOCUMENTS

| | | | | |
|---|---|---|---|---|
| 11,252,547 | B2 | 2/2022 | Patten et al. | |
| 11,425,070 | B2 * | 8/2022 | Young | G06Q 10/0833 |
| 11,564,156 | B2 * | 1/2023 | Estevez | H04W 28/24 |
| 12,101,305 | B2 * | 9/2024 | Roszak | G06F 21/56 |
| 2014/0337544 | A1 * | 11/2014 | Huang | G06F 13/385 710/63 |
| 2015/0134729 | A1 * | 5/2015 | Lim | H04L 67/02 709/203 |
| 2020/0372470 | A1 * | 11/2020 | Aboel-Nil | G06Q 10/107 |
| 2022/0353221 | A1 * | 11/2022 | Young | H04L 51/52 |
| 2022/0417799 | A1 * | 12/2022 | Schnitzler | H04W 28/24 |
| 2023/0360447 | A1 * | 11/2023 | El Essaili | G07C 5/008 |
| 2024/0388884 | A1 * | 11/2024 | Hu | H04W 8/065 |

FOREIGN PATENT DOCUMENTS

| | | | | |
|---|---|---|---|---|
| CN | 112887167 | A | 6/2021 | |
| EP | 3751789 | A1 * | 12/2020 | H04L 41/147 |
| EP | 4147440 | B1 * | 11/2023 | H04W 4/44 |
| KR | 10-2016-0006915 | A | 1/2016 | |
| TW | 201616414 | A | 5/2016 | |
| WO | WO-2020101388 | A1 * | 5/2020 | H04L 67/51 |
| WO | WO-2021063840 | A1 * | 4/2021 | H04L 41/5019 |
| WO | WO-2021064254 | A1 * | 4/2021 | H04W 24/10 |
| WO | WO-2022270970 | A1 * | 12/2022 | H04W 24/08 |

OTHER PUBLICATIONS

International Search Report and Written Opinion of the International Searching Authority dated Sep. 28, 2022, in connection with International Application No. PCT/KR2022/009022, 7 pages.

Examination report dated Feb. 22, 2023, in connection with Indian Application No. 202141028728, 6 pages.

3GPP TR 23.700-97 V0.5.0 (Mar. 2022), Technical Report, 3rd Generation Partnership Project; Technical Specification Group Services and System Aspects; Study on Application Capability Exposure for IoT Platforms; (Release 18), Mar. 2022, 26 pages.

3GPP TS 22.101 V17.3.0 (Mar. 2021), Technical Specification, 3rd Generation Partnership Project; Technical Specification Group Services and System Aspects; Service aspects; Service principles (Release 17), Mar. 2021, 103 pages.

3GPP TS 23.434 V17.1.0 (Apr. 2021), Technical Specification, 3rd Generation Partnership Project; Technical Specification Group Services and System Aspects; Service Enabler Architecture Layer for Verticals (SEAL); Functional architecture and information flows; (Release 17), Apr. 2021, 132 pages.

3GPP TS 23.288 V17.1.0 (Jun. 2021), Technical Specification, 3rd Generation Partnership Project; Technical Specification Group Services and System Aspects; Architecture enhancements for 5G System (5GS) to support network data analytics services (Release 17), Jun. 2021, 192 pages.

3GPP TS 23.436 V18.0.0 (Jun. 2023), Technical Report, 3rd Generation Partnership Project; Technical Specification Group Services and System Aspects; Functional architecture and information flows for Application Data Analytics Enablement Service; (Release 18), Jun. 2023, 64 pages.

Ericsson, "QoS Monitoring support," S6-211392 (revision of S6-211199 Rev1), 3GPP TSG-SA WG6 Meeting #43, e-meeting, May 24-Jun. 2, 2021, 10 pages.

Samsung, "Pseudo-CR on application status information collection from ASM client," S6-220456 (revision of S6-220365, S6-220183), 3GPP TSG-SA WG6 Meeting #47-e, e-meeting, Feb. 14-22, 2022, 4 pages.

Samsung, "Pseudo-CR on update to solution 1," S6-220879 (revision of S6-220742), 3GPP TSG-SA WG6 Meeting #48-e, e-meeting, Apr. 5-14, 2022, 3 pages.

Samsung, "Pseudo-CR on Service experience to support application performance analytics," S6-230850 (revision of S6-230675, S6-230230), 3GPP TSG-SA WG6 Meeting #53, Athens, Greece, Feb. 27-Mar. 3, 2023, 5 pages.

Supplementary European Search Report dated Jul. 22, 2024, in connection with European Application No. 22828817.1, 14 pages.

3GPP TS 23.558 V2.2.1 (Jun. 2021), Technical Specification, 3rd Generation Partnership Project; Technical Specification Group Services and System Aspects; Architecture for enabling Edge Applications (Release 17), Jun. 2021, 157 pages.

Samsung, "Pseudo-CR on application status information collection from ASM client," S6-220183 (revision of S6-22xxxx), 3GPP TSG-SA WG6 Meeting #47-e, e-meeting, Feb. 14-22, 2022, 3 pages.

Office Action issued May 21, 2026, in connection with European Patent Application No. 22828817.1, 7 pages.

* cited by examiner

[Fig. 1a]
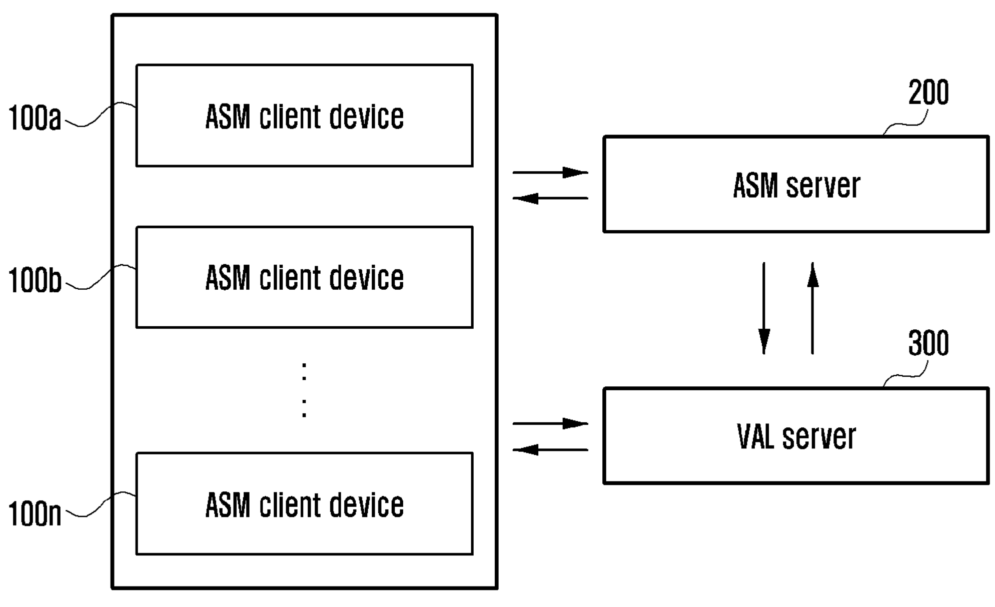
[Fig. 1b]
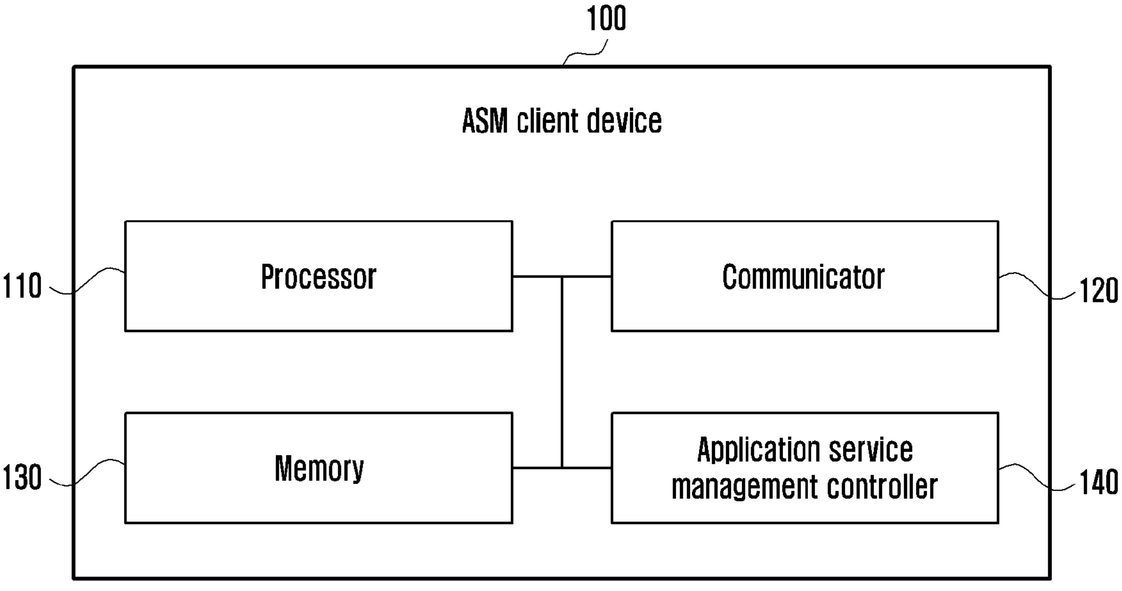

[Fig. 1c]
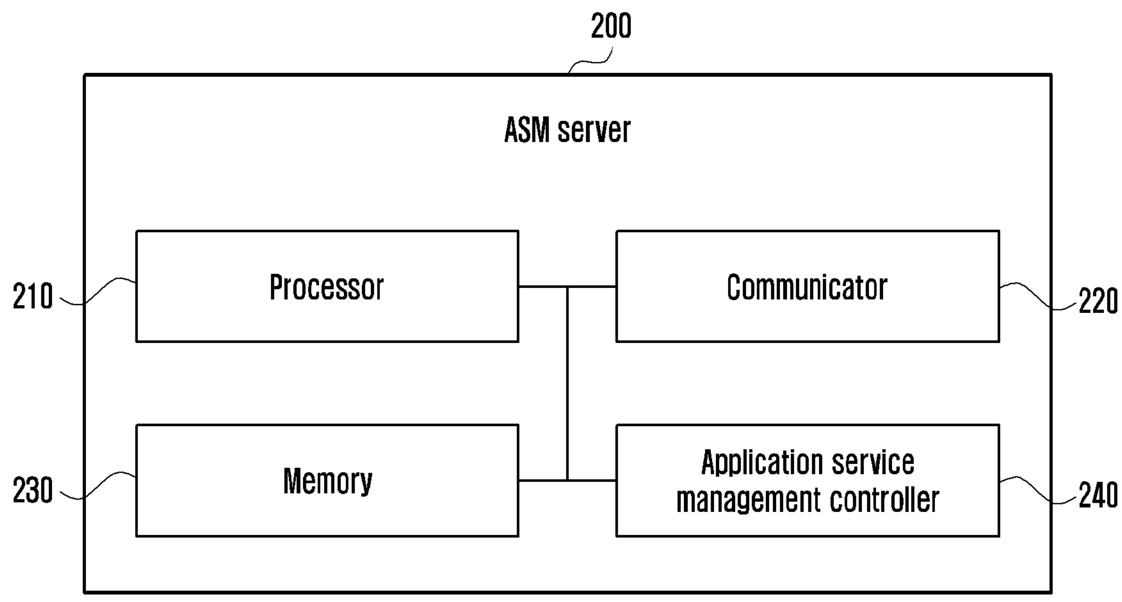

[Fig. 2]
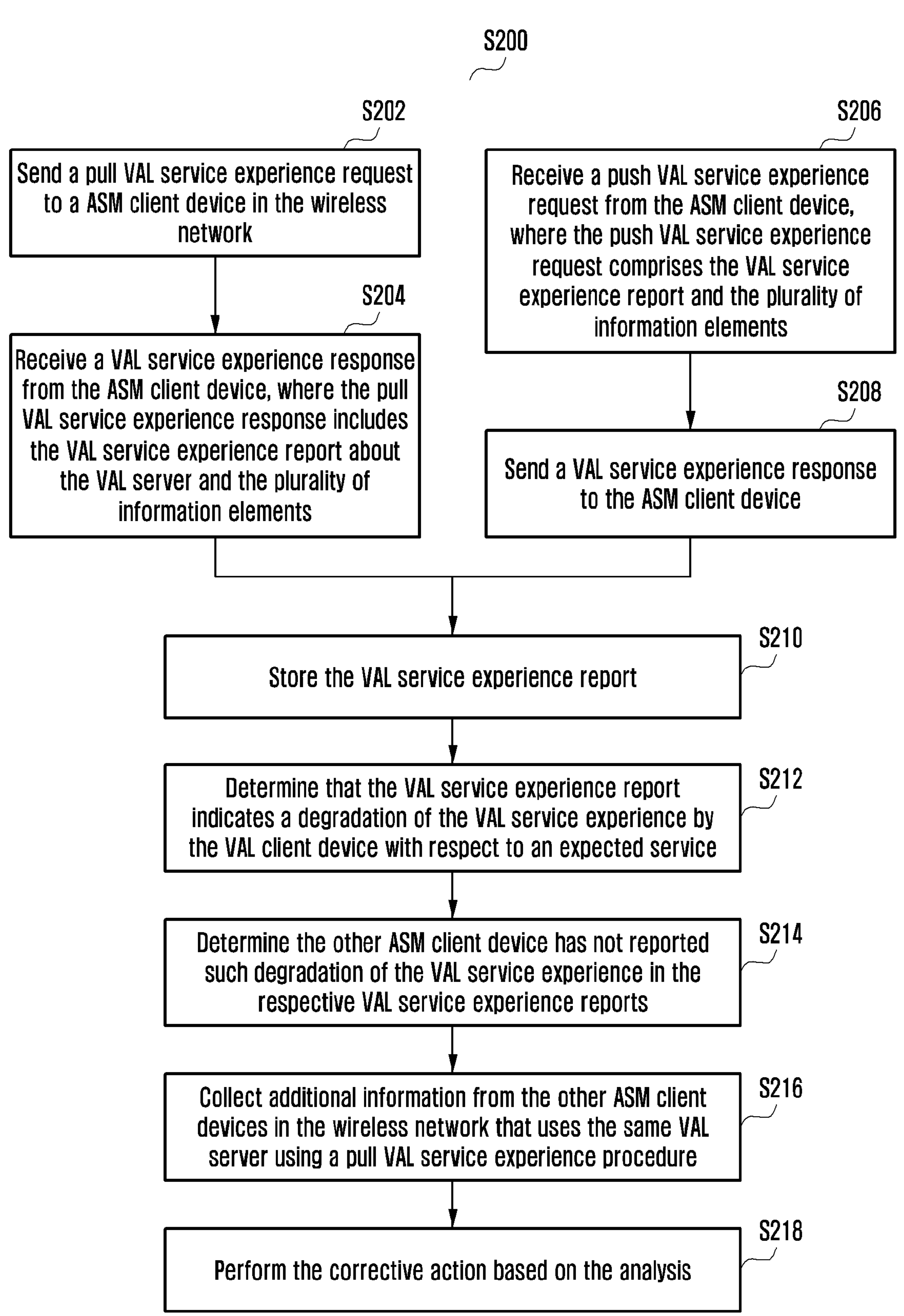

[Fig. 3]
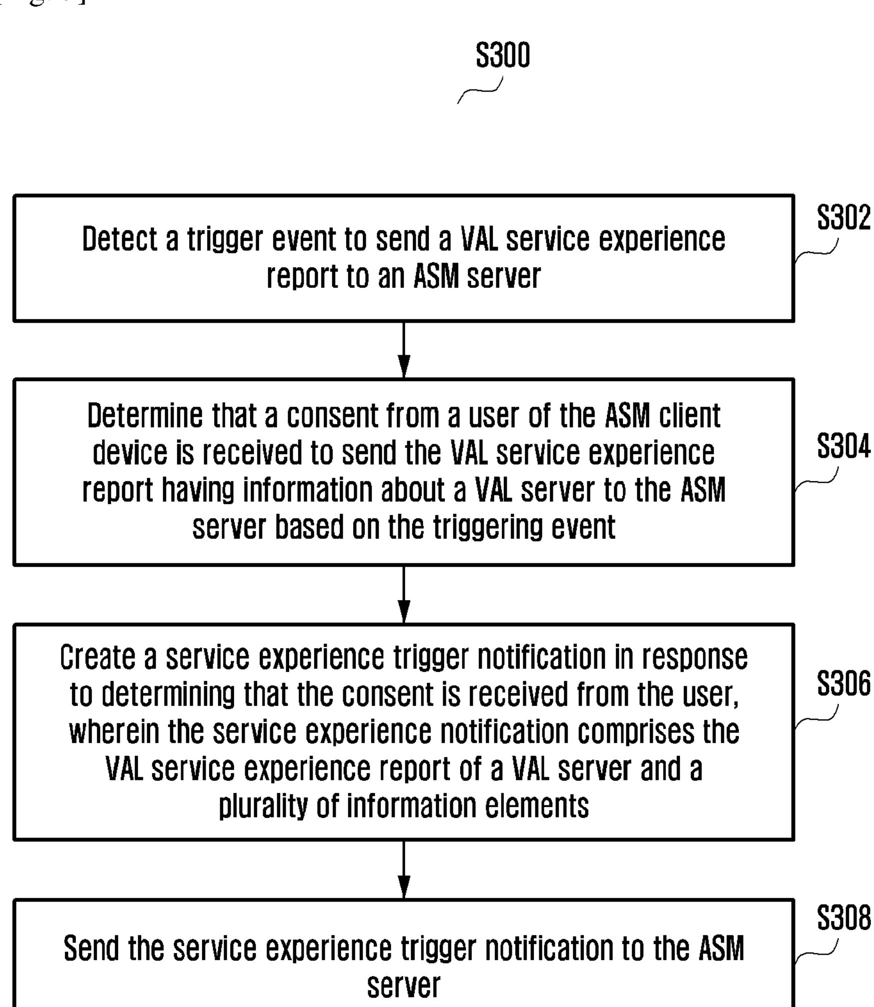

[Fig. 4]
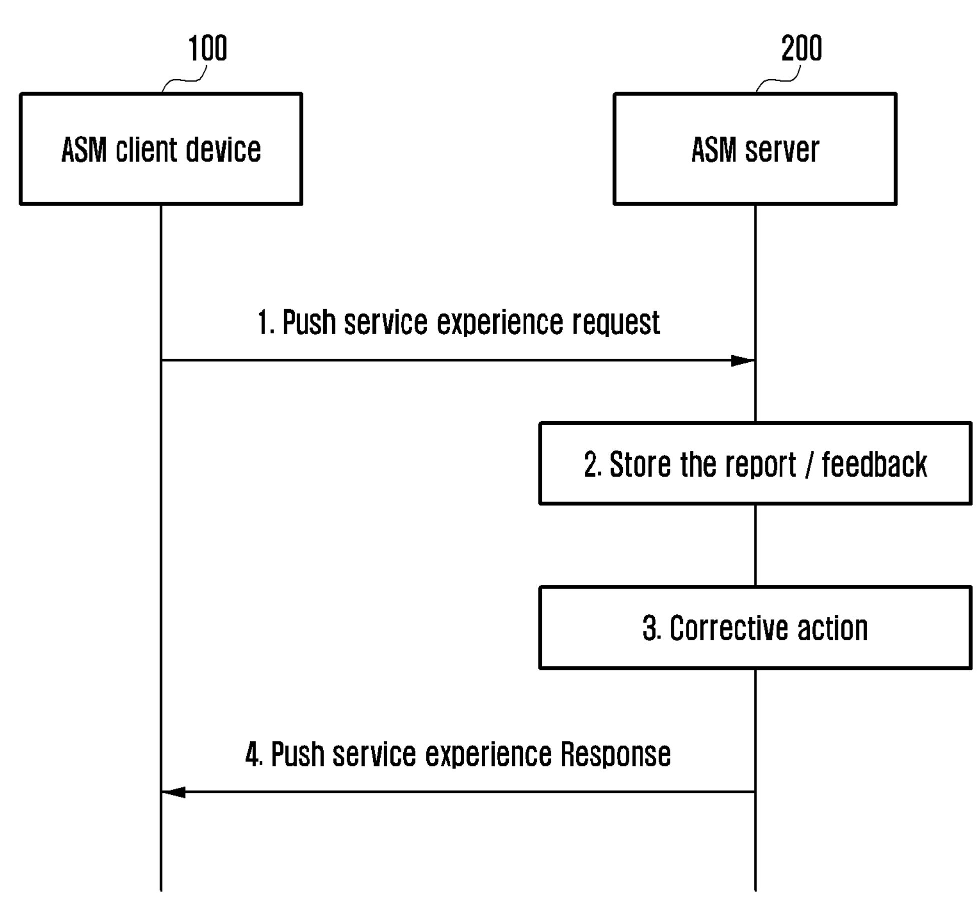

[Fig. 5]
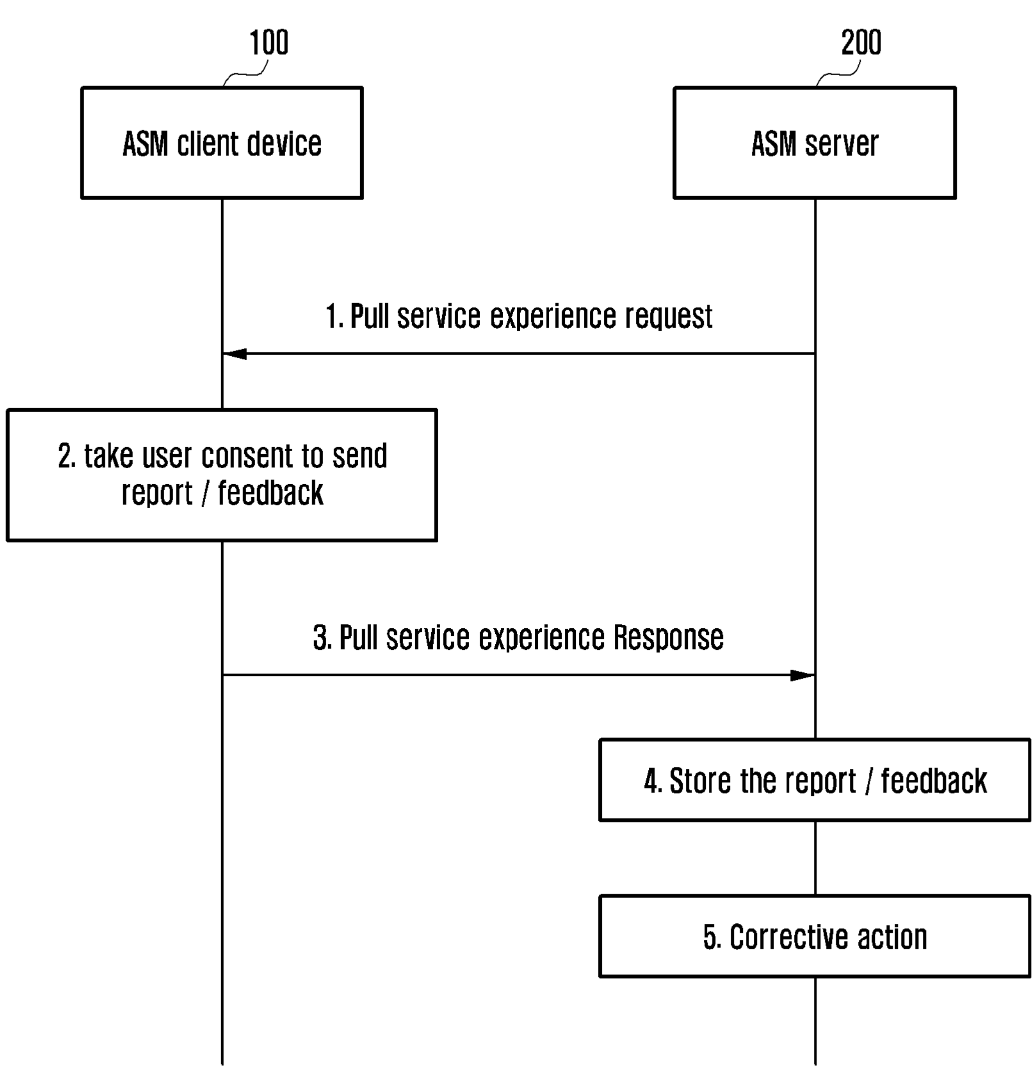

[Fig. 6]
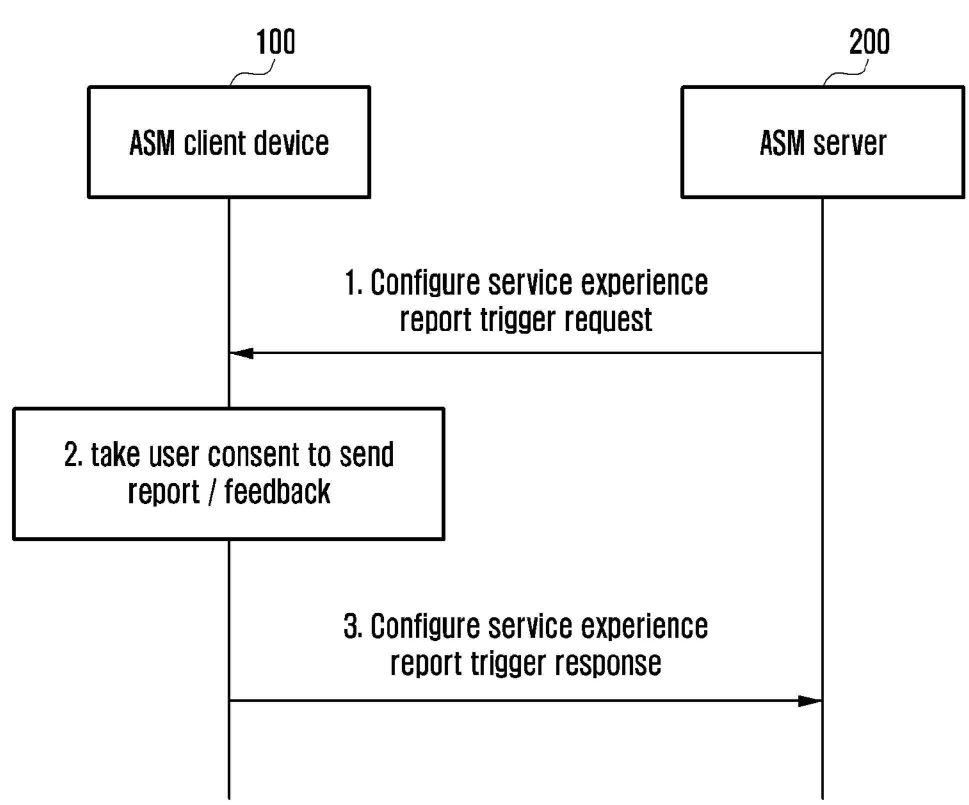

[Fig. 7]

METHOD AND SYSTEM FOR APPLICATION SERVICE MANAGEMENT USING CLIENT FEEDBACK IN WIRELESS NETWORK

TECHNICAL FIELD

The present disclosure relates to wireless networks, and more specifically related to systems and methods for an application service management using a client feedback in the wireless networks.

BACKGROUND ART 5G mobile communication technologies define broad frequency bands such that high transmission rates and new services are possible, and can be implemented not only in “Sub 6 GHz” bands such as 3.5 GHz, but also in “Above 6 GHz” bands referred to as mmWave including 28 GHZ and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (cMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultrahigh-performance communication and computing resources.

DISCLOSURE OF INVENTION

Technical Problem

Internet of Things (IoT) refers to the system where tangible or intangible objects are connected in order to provide new services. In other words, it is the process by which various “things” get connected to internet to interact with each other. Applications are the means through which service providers engage with devices and users to provide their services. There are many applications where IoT devices are used as a remote control wherein quick response time is desired. It is required to monitor the application servers and the underlying networks to ensure the service availability to the user is seamless and uninterrupted. The application service monitoring provides information on service availability aspects and situations when the devices are not able to connect to the application servers—either due to fault (e.g. connection failure, application failure, hardware failure) or a network congestion.

It is required to monitor application server's status in order to fulfil the service requirements. However, in many cases, it is not possible for application monitoring system to receive information from the application server as the application server is over loaded or malfunctions or any other reasons. In such cases, the application monitoring system needs to also rely on alternate information sources like the application clients that provide the visibility on application service status, which the application monitoring system can use for triggering any corrective actions.

Further, with increase in IoT devices, there are several use cases which require processing requests at an edge to address stringent latency requirements and avoid overloading the backhaul networks. In edge computing, an Edge Enabler Client (EEC) discovers an Edge Application Server (EAS) from an Edge Enabler Server (EES), such that the discovered EAS can provide the required key performance indicator (KPIs) as requested by the EEC. Further, the EEC uses the discovered EAS to access the specific service. However, it is possible that the EAS may not be able to meet the KPI requirements as requested by the EEC, and further the EAS may not able to provide measurement reports due to certain reasons like server over loaded with requests or server malfunctioning or any other reasons. In such case, the EES may rely on the EEC to provide the EAS status which the EES can use for triggering corrective actions.

Thus, it is desired to address the above mentioned disadvantages or other shortcomings or at least provide a useful alternative.

Solution to Problem

Accordingly, the embodiment herein is to provide a method for application service management using a client feedback in a wireless network. The method includes receiving, by an ASM server in the wireless network, a VAL service experience report having information about a VAL server and a plurality of information elements by an ASM client device in the wireless network. Further the method includes storing, by the ASM server, the VAL service experience report. Further the method includes analyzing, by the ASM server, the VAL service experience report received from the ASM client device and VAL service experience reports received from other ASM client devices in the wireless network. Further the method includes performing, by the ASM server, at least one corrective action based on the analysis.

In an embodiment, the at least one corrective action comprises at least one of trigger Application context Relocation (ACR) for multiple User Equipment's (UEs) connected to the VAL server, requests allocation of resources to the VAL server, send a network path optimization request to a core network to change of at least one of an uplink traffic path and a downlink traffic path for the VAL server, and a produce performance measurement metrics to be reported to an Operations Administration and Maintenance (OAM) entity.

In an embodiment, if many other EECs are reporting the degradation of a service experience, an EES may decide not to include specific EAS in an EAS discovery response in the future for the configured amount of time. If the EES receives service experience report for the EAS before the configured time is elapse, then the EES may decide to increase time during which the EAS is not considered for the EAS discovery response. Once the configured time elapses, the EES may consider adding the EAS back for the discovery response. The EES may increase the time duration during which the EAS will not be included in the EAS discovery response if service experience report is received again for the EAS.

In an embodiment, analyzing, by the ASM server, the VAL service experience report received from the ASM client device and the VAL service experience reports received from the other ASM client devices in the wireless network includes determining, by the ASM server, that the VAL service experience report indicates a degradation of the VAL service experience by the VAL client device with respect to an expected service, determining, by the ASM server, the other ASM client device has not reported such degradation of the VAL service experience in the respective VAL service experience reports, and collecting, by the ASM server, additional information from the other ASM client devices in the wireless network that uses the same VAL server using a pull VAL service experience procedure.

In an embodiment, the plurality of information elements includes a VAL User Equipment (UE) Identifier (ID) identifying a VAL UE triggering the push VAL service experience request, a VAL service ID identifying a VAL service, a VAL server ID identifying the VAL server for which the VAL service experience report is being sent by the ASM client device, and a time stamp of measurement of the VAL service experience report.

In an embodiment, the VAL service experience report comprises information related to VAL service experience, an end-to-end response time, a connection bandwidth, a request rate, and a VAL server availability.

In an embodiment, receiving, by the ASM server, the VAL service experience report having information about the VAL server and the plurality of information elements includes receiving, by the ASM server, a push VAL service experience request from the ASM client device, where the push VAL service experience request comprises the VAL service experience report and the plurality of information elements, and sending, by the ASM server, a VAL service experience response to the ASM client device.

In an embodiment, receiving, by the ASM server, the VAL service experience report about the VAL server and the plurality of information elements includes sending, by the ASM server, a pull VAL service experience request to the ASM client device in the wireless network, and receiving, by the ASM server, a pull VAL service experience response from the ASM client device, wherein the pull VAL service experience response comprises the VAL service experience report about the VAL server and the plurality of information elements.

In an embodiment, the pull VAL service experience request comprises a VAL service ID and a VAL server ID for which the VAL service experience report is requested Accordingly, the embodiment herein is to provide a method for application service management using a client feedback in a wireless network. The method includes detecting, by an ASM client device in the wireless network, a trigger event to send a VAL service experience report to an ASM sever. Further, the method includes determining, by the ASM client device, whether a consent from a user of the ASM client device is received to send the VAL service experience report having information about a VAL server to the ASM sever based on the triggering event. Further, the method includes creating, by the ASM client device, a service experience report notification in response to determining that the consent is received from the user, wherein the service experience notification comprises the VAL service experience report of a VAL server and a plurality of information elements. Further, the method includes sending, by the ASM client device, the service experience report notification to the ASM server.

In an embodiment, detecting the trigger event includes at least one of detecting a VAL user request to send the VAL service experience report to the ASM sever, detecting a push VAL service experience request from the VAL application client to send the VAL service experience report to the ASM sever, detecting a pull VAL service experience request from the ASM server to send the VAL service experience report to the ASM sever, and detecting a predefined period to send the VAL service experience report to the ASM sever.

In an embodiment, the method includes receiving, by the ASM client device, a VAL service experience response from the ASM server.

Accordingly, the embodiment herein is to provide an ASM server for application service management using a client feedback in a wireless network. The ASM server includes an application service management controller communicatively coupled to a memory and a processor. The application service management controller is configured to receive a VAL service experience report having information about a VAL server and a plurality of information elements by an ASM client device in the wireless network. Further, the application service management controller is configured to store the VAL service experience report and analyze the VAL service experience report received from the ASM client device and VAL service experience reports received from other ASM client devices in the wireless network. Further, the application service management controller is configured to perform at least one corrective action based on the analysis.

Accordingly, the embodiment herein is to provide an ASM client device for application service management using a client feedback in a wireless network. The ASM client device includes an application service management controller communicatively coupled to a memory and a processor. The application service management controller is configured to detect a trigger event to send a VAL service experience report to an ASM sever. The application service management controller is configured to determine whether a consent from a user of the ASM client device is received to send the VAL service experience report having information about a VAL server to the ASM sever based on the triggering event. Further, the application service management controller is configured to create a service experience report notification in response to determining that the consent is received from the user. The service experience notification includes the VAL service experience report of a VAL server and a plurality of information elements. Further, the application service management controller is configured to send the service experience report notification to the ASM server.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

Advantageous Effects of Invention

The principal object of the embodiments herein is to provide systems and methods for an application service management using a client feedback in a wireless network. The method can be used to improve a service enabler architecture layer (SEAL) application service monitoring architecture operation. The method can be used to monitor an application status by receiving the feedback from an application client. Based on the proposed method, a coordination between a transport layer and a vertical application layer will be improved and which will be useful for operators and vertical application service provider to provide improved service experience to their customers.

Based on the received feedback from the clients, an operator can serve the VAL service provider's customers better by configuring the required Quality of Service (QOS), which will result in increase of customer satisfaction. The application service provider can benefit from the actual network QOS status information where it can take suitable action like optimization, throttling, priority to improve their customer delight.

BRIEF DESCRIPTION OF DRAWINGS

The embodiments are illustrated in the accompanying drawings, throughout which like reference letters indicate corresponding parts in the various figures. The embodiments herein will be better understood from the following description with reference to the drawings, in which:

FIG. 1*a* illustrates a wireless network for an application service management using a client feedback, according to the embodiments as disclosed herein;

FIG. 1*b* shows various hardware components of an ASM client device, according to the embodiments as disclosed herein;

FIG. 1*c* shows various hardware components of an ASM server, according to the embodiments as disclosed herein;

FIG. 2 is a flow chart illustrating a method, implemented by the ASM server, for the application service management using the client feedback in the wireless network, according to the embodiments as disclosed herein;

FIG. 3 is a flow chart illustrating a method, implemented by the ASM client device, for the application service management using the client feedback in the wireless network, according to the embodiments as disclosed herein;

FIG. 4 illustrating a scenario of application service monitoring (ASM) client device pushes a service experience report to the ASM server, according to the embodiments as disclosed herein;

FIG. 5 illustrating a scenario of ASM server pulls service experience report from the ASM client device, according to the embodiments as disclosed herein;

FIG. 6 illustrating a scenario of the ASM server configures triggers to send service experience report to the ASM client device, according to the embodiments as disclosed herein; and FIG. 7 illustrating a scenario of ASM client device (100) sends a service experience report to the ASM server, according to the embodiments as disclosed herein.

MODE FOR THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The terms "ASM server" and "EES" are used interchangeably in the patent disclosure. The terms "ASM client device" and "EEC" are used interchangeably in the patent disclosure. The terms "VAL server" and "EAS" are used interchangeably in the patent disclosure. The terms "CAPIF Core Function (CCF)" and "ASM server" are used interchangeably in the patent disclosure. The terms "API invoker" and "CAPIF client" are used interchangeably in the patent disclosure.

Accordingly, the embodiment herein is to provide a method for application service management using a client feedback in a wireless network. The method includes receiving, by an ASM server in the wireless network, a VAL service experience report having information about a VAL server and a plurality of information elements by an ASM client device in the wireless network. Further the method includes storing, by the ASM server, the VAL service experience report. Further the method includes analyzing, by the ASM server, the VAL service experience report received from the ASM client device and VAL service experience reports received from other ASM client devices in the wireless network. Further the method includes performing, by the ASM server, at least one corrective action based on the analysis.

The proposed method allows the ASM client device to send service experience report to the ASM server. The ASM server pulls the service experience report as and when required or to configure the client device with triggering events based on which the client device can send the service experience report.

As mentioned in 3rd Generation Partnership Project (3GPP) TS 22.101, it is required by operators to control traffic from UEs to an application on a third party server or the third party server itself. When an application on a third party server or the third party server itself becomes congested or fails the traffic towards that server need to be controlled to avoid/mitigate potential issues caused by resulting unproductive use of 3GPP network resources. In many cases, the application servers provide services with specific Key Performance Indicators (KPIs). However, at times the clients using the service may not experience the KPIs that were indicated at time of service contract, due to many reasons like server overload or application level traffic congestion, etc. Further, application monitoring system may not able to receive status information that may impact the client service KPIs, from application server itself, as the thresholds may not have crossed at the application server, to notify the status or notification(s) may have missed/dropped. In such events, no mechanism exists for application monitoring system to know whether the application client is receiving service as per the agreed service KPIs or not.

Further, in the architecture for enabling edge applications, as per TS 23.558, the Edge Enabler Client (EEC) sends request to the Edge enabler Server (EES) to discover Edge Application Server (EAS) which can fulfil the service KPIs as required by the application client (AC). The EES determines the matching EAS based on the EAS registration details and provides the discovery response. It is not known to the EES, whether the AC is receiving the service experience as per the service KPIs.

The proposed method provides a new behaviour for the Application Service Monitoring (ASM) client device to monitor the application service KPIs. Further, the proposed method provides a method sharing the service experience report from the ASM client device to the ASM server. Further, the proposed method provides new behaviour for the ASM server to process the service experience report based on information received from the ASM client device. Further, the proposed method provides a method for the ASM server to obtain the current service experience report, based on a request to the ASM client device. Further, the proposed method provides a method for the ASM server to configure the ASM client device to share the current service experience report to the ASM server on specific events. Furthermore, in the proposed method the new Application Programming Interface (API) by the ASM client device to receive service experience report from a VAL client.

The service experience report is a step further proactively intimating the ASM server about failure of meeting service KPIs. Otherwise, the ASM server will wait for actual failure events like UE not reachable, QoS degradation from VAL server or 3GPP network. Using the service experience report, the ASM server gets information about the actual service KPIs as experienced by the VAL user/client.

The method can be used to improve a service enabler architecture layer (SEAL) application service monitoring architecture. The method can be used to monitor an application status by receiving feedback from the application client. Based on the proposed method, a co-ordination between a transport layer and a vertical application layer will be improved and which will be useful for operators and vertical application service provider to provide improved service experience to their customers.

Based on the received feedback from the clients, the operator can serve the VAL service provider's customers better by configuring the required Quality of Service (QOS), which will result in increase of customer satisfaction. The application Service Provider can benefit from the actual network QOS status information where it can take suitable action like optimization, throttling, priority to improve their customer delight.

Figure 7:
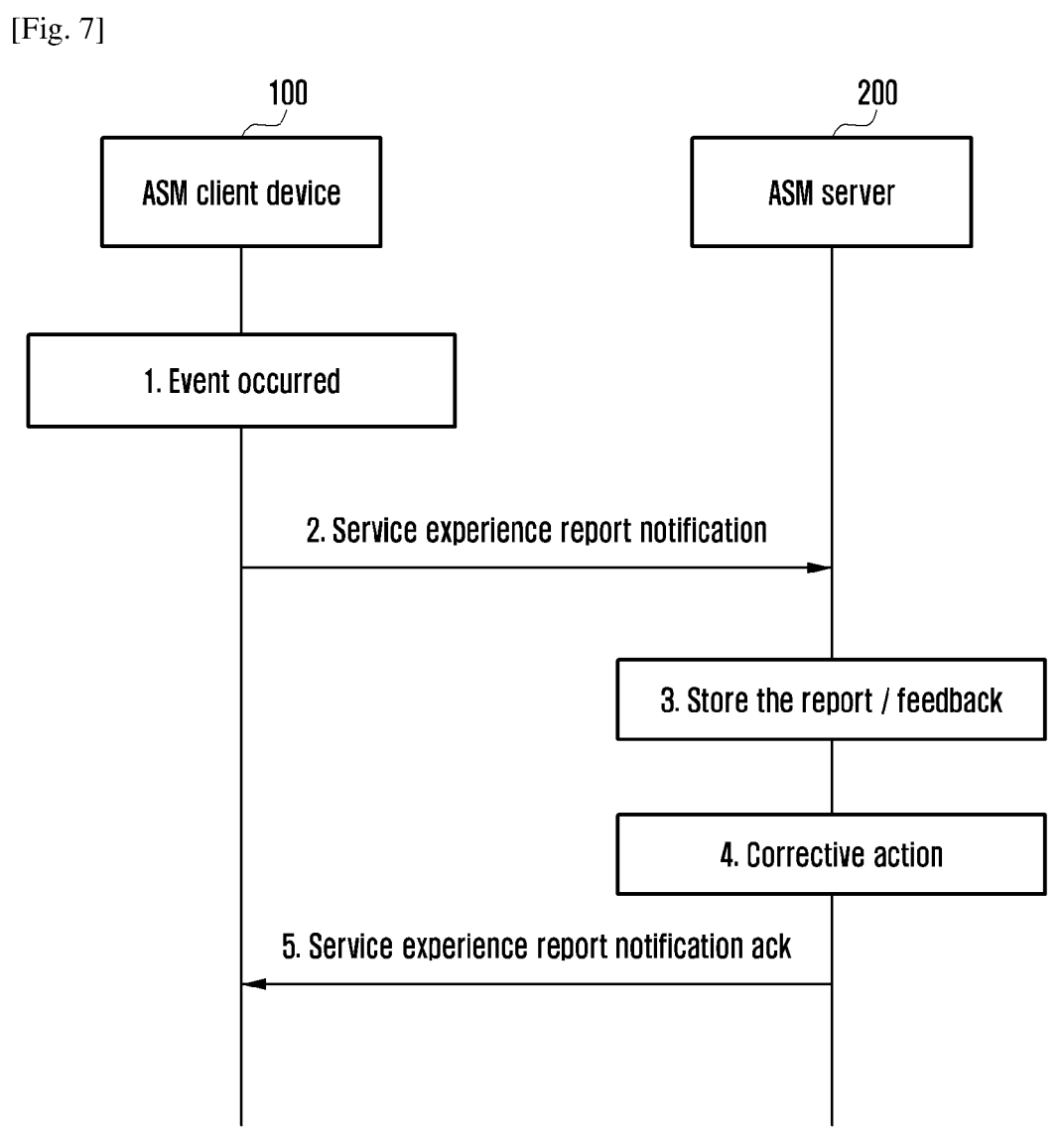

Referring now to the drawings and more particularly to FIGS. 1*a* through 7, where similar reference characters denote corresponding features consistently throughout the figures, there are shown preferred embodiments.

FIG. 1*a* illustrates overview of a wireless network (1000) for an application service management using a client feedback, according to the embodiments as disclosed herein. In an embodiment, the wireless network (1000) includes one or more ASM client device (100*a*-100*n*), a ASM server (200) and a VAL server (300). The wireless network (1000) can be, for example, but not limited to a fourth generation (4G) network, a fifth generation (5G) network, a sixth generation (6G) network or the like.

The ASM client device (100) detects a trigger event to send a VAL service experience report to the ASM sever (200). The trigger event can be, for example, but not limited to a VAL user request to send the VAL service experience report to the ASM sever (200), push VAL service experience request from the VAL application client to send the VAL service experience report to the ASM sever (200), a pull VAL service experience request from the ASM server (200) to send the VAL service experience report to the ASM sever (200), and a predefined period to send the VAL service experience report to the ASM sever (200).

The VAL service experience report includes information related to VAL service experience, an end-to-end response time, a connection bandwidth, a request rate, and a VAL server availability. The end-to-end response time, the connection bandwidth, the request rate, and a VAL server availability are the parameters being monitored for the VAL service. For example, what is the request-response time for a Game server when client is sending a request? How many request is revered by the server within given time, for a given time (e.g., a day)—how much time the server was available for the client? etc.

Further, the ASM client device (100) determines whether a consent from a user of the ASM client device (100) is received to send the VAL service experience report having information about the VAL server (300) to the ASM sever (200) based on the triggering event. Further, the ASM client device (100) creates a service experience report notification in response to determining that the consent is received from the user. The service experience notification comprises the VAL service experience report of the VAL server (300) and a plurality of information elements. The plurality of information elements can be, for example, but not limited to a VAL UE Identifier (ID) identifying a VAL UE triggering the push VAL service experience request, a VAL service ID identifying a VAL service, a VAL server ID identifying the VAL server (300) for which the VAL service experience report is being sent by the ASM client device (100), and a time stamp of measurement of the VAL service experience report.

Further, the ASM client device (100) sends the service experience report notification to the ASM server (200). The ASM client device (100) receives the VAL service experience response from the ASM server (200) based on the service experience report notification.

The ASM server (200) receives the VAL service experience report having information about the VAL server (300) and the plurality of information elements by the ASM client device (100) in the wireless network (1000). In an embodiment, the ASM server (200) receives a push VAL service experience request from the ASM client device (100), where the push VAL service experience request includes the VAL service experience report and the plurality of information elements. Further, the ASM server (200) sends a VAL service experience response to the ASM client device (100).

In another embodiment, the ASM server (200) sends a pull VAL service experience request to the ASM client device (100) in the wireless network (1000). The pull VAL service experience request includes a VAL service ID and a VAL server ID for which the VAL service experience report is requested. Further, the ASM server (200) receives a pull VAL service experience response from the ASM client device (100), where the pull VAL service experience response comprises the VAL service experience report about the VAL server (300) and the plurality of information elements.

Further, the ASM server (200) stores the VAL service experience report and analyzes the VAL service experience report received from the ASM client device (100) and VAL service experience reports received from other ASM client devices (100) in the wireless network (1000).

In an embodiment, the ASM server (200) determines that the VAL service experience report indicates a degradation of the VAL service experience by the VAL client device with respect to an expected service. Further, the ASM server (200) determines the other ASM client device has not reported such degradation of the VAL service experience in the respective VAL service experience reports. Further, the ASM server (200) collects additional information from the other ASM client devices in the wireless network (1000) that uses the same (300) using a pull VAL service experience procedure.

Further, the ASM server (200) performs at least one corrective action based on the analysis. The at least one corrective action can be, for example, but not limited to at least one of trigger Application context Relocation (ACR) for multiple UEs connected to the VAL server (300), requests allocation of resources to the VAL server (300), send a network path optimization request to a core network to change of at least one of an uplink traffic path and a downlink traffic path for the VAL server (300), and a produce performance measurement metrics to be reported to an OAM entity.

In an example, if many other EECs are reporting the degradation of the service experience, the EES may decide not to include specific EAS in the EAS discovery response in the future for the configured amount of time. If the EES receives service experience report for the EAS before the configured time is elapse, then the EES may decide to increase time during which the EAS is not considered for the EAS discovery response. Once the configured time elapses, the EES may consider adding the EAS back for the discovery response. The EES may increase the time duration during which the EAS will not be included in the EAS discovery response if service experience report is received again for the EAS.

FIG. 1*b* shows various hardware components of the ASM client device (100), according to the embodiments as disclosed herein. In an embodiment, the ASM client device (100) includes a processor (110), a communicator (120), a memory (130), and an application service management controller (140). The processor (110) is coupled with the communicator (120), the memory (130) and the application service management controller (140).

The application service management controller (140) detects the trigger event to send the VAL service experience report to the ASM sever (200). Further, the application service management controller (140) determines whether the consent from the user of the ASM client device (100) is received to send the VAL service experience report having information about a VAL server (300) to the ASM sever (200) based on the triggering event. In response to determining that the consent is received from the user, the application service management controller (140) creates the service experience report notification, wherein the service experience report notification includes the VAL service experience report of the VAL server (300) and the plurality of information elements.

Further, the application service management controller (140) sends the service experience report notification to the ASM server (200). Based on the service experience report notification, the application service management controller (140) receives the VAL service experience response from the ASM server (200).

The application service management controller (140) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (110) is configured to execute instructions stored in the memory (130) and to perform various processes. The communicator (120) is configured for communicating internally between internal hardware components and with external devices via one or more networks. The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

Although the FIG. 1*b* shows various hardware components of the ASM client device (100) but it is to be understood that other embodiments are not limited thereon. In other embodiments, the ASM client device (100) may include less or more number of components. Further, the labels or names of the components are used only for illustrative purpose and does not limit the scope of the invention. One or more components can be combined together to perform same or substantially similar function in the ASM client device (100).

FIG. 1*c* shows various hardware components of the ASM server (200), according to the embodiments as disclosed herein. In an embodiment, the ASM server (200) includes a processor (210), a communicator (220), a memory (230), and an application service management controller (240). The processor (210) is coupled with the communicator (220), the memory (230) and the application service management controller (240).

The application service management controller (240) receives the VAL service experience report having information about the VAL server (300) and the plurality of information elements by an ASM client device (100) in the wireless network (1000).

In an embodiment, the application service management controller (240) receives the push VAL service experience request from the ASM client device (100) and sends the VAL service experience response to the ASM client device (100). In another embodiment, the application service management controller (240) sends the pull VAL service experience request to the ASM client device (100) in the wireless network (1000) and receives a pull VAL service experience response from the ASM client device (100), wherein the pull VAL service experience response comprises the VAL service experience report about the VAL server (300) and the plurality of information elements.

Further, the application service management controller (240) stores the VAL service experience report and analyzes the VAL service experience report received from the ASM client device (100) and VAL service experience reports received from other ASM client devices (100) in the wireless network (1000). In an embodiment, the application service management controller (240) determines that the VAL service experience report indicates the degradation of the VAL service experience by the VAL client device with respect to an expected service. Further, the application service management controller (240) determines the other ASM client device has not reported such degradation of the VAL service experience in the respective VAL service experience reports. Further, the application service management controller (240) collects additional information from the other ASM client devices in the wireless network (1000) that uses the same (300) using a VAL service experience procedure.

Based on the analysis, the application service management controller (240) performs the corrective action The application service management controller (240) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (210) is configured to execute instructions stored in the memory (230) and to perform various processes. The communicator (220) is configured for communicating internally between internal hardware components and with external devices via one or more networks. The memory (230) also stores instructions to be executed by the processor (210). The memory (230) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In certain examples, a non-transitory storage medium may store data that can, over time, change (e.g., in Random Access Memory (RAM) or cache).

Although the FIG. 1*c* shows various hardware components of the ASM server (200) but it is to be understood that other embodiments are not limited thereon. In other embodiments, the ASM server (200) may include less or more number of components. Further, the labels or names of the components are used only for illustrative purpose and does not limit the scope of the invention. One or more components can be combined together to perform same or substantially similar function in the ASM server (200).

FIG. 2 is a flow chart (S200) illustrating a method, implemented by the ASM server (200), for the application service management using the client feedback in the wireless network (1000), according to the embodiments as disclosed herein. The operations (S202-S218) are handled by the application service management controller (240).

At S202, the method includes sending the pull VAL service experience request to the ASM client device (100) in the wireless network (1000). At S204, the method includes receiving the VAL service experience response from the ASM client device (100). The pull VAL service experience response includes the VAL service experience report about the VAL server (300) and the plurality of information elements. At S206, the method includes receiving the push VAL service experience request from the ASM client device (100). The push VAL service experience request includes the VAL service experience report and the plurality of information elements. At S208, the method includes sending the VAL service experience response to the ASM client device (100). At S210, the method includes storing the VAL service experience report.

At S212, the method includes determining that the VAL service experience report indicates the degradation of the VAL service experience by the VAL client device (100) with respect to the expected service. At S214, the method includes determining the other ASM client device (100*a*-100*n*) has not reported such degradation of the VAL service experience in the respective VAL service experience reports. At S216, the method includes collecting the additional information from the other ASM client devices (100*b*-100*n*) in the wireless network (1000) that uses the VAL server (300) using the pull VAL service experience procedure. At S218, the method includes performing the corrective action based on the analysis.

FIG. 3 is a flow chart (S300) illustrating a method, implemented by the ASM client device (100), for the application service management using the client feedback in the wireless network (1000), according to the embodiments as disclosed herein. The operations (S302-S308) are handled by the application service management controller (140).

At S302, the method includes detecting the trigger event to send the VAL service experience report to the ASM server (200). At S304, the method includes determining that the consent from the user of the ASM client device (100) is received to send the VAL service experience report having information about the VAL server (300) to the ASM server (200) based on the triggering event. At S306, the method includes creating the service experience report notification in response to determining that the consent is received from the user. The service experience notification comprises the VAL service experience report of the VAL server (300) and the plurality of information elements. At S308, the method includes sending the service experience report notification to the ASM server (200).

FIG. 4 illustrating a scenario of ASM client device (100) pushes service experience report to the ASM server (200), according to the embodiments as disclosed herein.

Referring to the FIG. 4 consider a proposed method, the ASM client device (100) keeps monitoring the different service KPIs as experienced for the application service. The KPIs include application specific performance measurements like end-to-end response time, connection bandwidth, request rate, server availability time, etc. On request from user or VAL client or any other trigger conditions, the ASM client device (100) sends the service experience report about the VAL server (300) to the ASM server (200). The pre-condition is as follows:

1. The ASM client device (100) determines to send service experience report based on certain criteria (e.g. VAL user request, VAL client request, any preconfigured or explicit configured triggering event, periodic event, like so)

The steps are as follows:

1. The ASM client device (100) sends the push service experience request to the ASM server (200). The push service experience request includes the service experience report about the VAL server (300) and includes the information elements as specified in Table (1).
2. Upon receiving the push service experience request from the ASM client device (100), the ASM server (200) stores the report in to the memory (130) or a permanent storage.
3. The ASM server (200) may take further actions based on the analysis of the report as shared by the ASM client device (100).

a. If the report indicates the degradation of the service experience by the VAL client or the UE with respect to the expected service, and if no other ASM client device has reported such experience, then the ASM server (200) may decide to localize the problem and determine to collect the similar report using pull service experience procedure from the other ASM client devices that are associated with the VAL client using the services of the same VAL server (300). Based on the collective analysis of all reports, the ASM server (200) may initiate further actions. Further, the ASM server (200) shall use the response (service experience information) from the multiple ASM client devices, to determine if the service experience degradation issue is localized and specific to a UE/VAL client or at the application service (VAL server) level affecting multiple UEs/VAL clients. Following is one example illustration of the ASM server (200) determining this:

i. if only few other ASM clients are reporting the degradation of the service experience, the ASM server (200) may determine that the service experience degradation issue is specific to some UE or the VAL client on the UE and not to the application service in general;

ii. if many other ASM clients (aka "ASM client's device") are reporting the degradation of the service experience, the ASM server (200) may invoke further actions towards application server or 3GPP network.

The exact action depends on the vertical application.

4. The ASM server (200) sends the push service experience response to the ASM client device (100). The response message includes the information elements as specified in Table (3). If the issue is identified with the VAL UE, the ASM server (200) may include the information about the further actions to be taken by the VAL UE in the response message.

In another embodiment, step 3 and step 4 can be performed in any order. If step 4 is performed before step 3 then the ASM server (200) will not include any corrective action in the push service experience response to the ASM client device (100). And corrective action is required for the UE, the ASM server (200) sends the corrective action in separate request message to the ASM client device (100).

In another embodiment, the procedure is also applicable to EDGEAPP architecture, where the Edge Enabler Client (EEC) takes the role of the ASM client device (100) and the Edge Enabler Server (EES) takes the role of the ASM server (200). The EEC provides the service experience report for the Edge Application Server (EAS).

In another embodiment, if many other EECs are reporting the degradation of the service experience, the EES may decide not to include specific EAS in the EAS discovery response for the configured amount of time. If the EES receives service experience report for the EAS before the configured time is elapse, then the EES may decide to increase the time during which the EAS is not considered for the EAS discovery response. Once the configured time elapses, the EES may consider adding the EAS back for the discovery response. The EES may increase the time duration during which the EAS will not be included in the EAS discovery response if service experience report is received again for the EAS.

In another embodiment, if many other EECs are reporting the degradation of the service experience, the EES may trigger Application context Relocation (ACR) for multiple UEs connected to that EAS. Further, the EES may requests allocation of resources to the EAS.

In another embodiment, if many other EECs are reporting the degradation of the service experience, the EES may send the network path optimization request to the core network to change of the uplink/downlink traffic paths for the EAS.

In another embodiment, if the end-to-end response time is more than the expected response time, the EES may produce performance measurement metrics to be reported to OAM for further actions. Upon receiving the notification from the OAM about the completion of the corrective measures, the EES may consider to add the EAS back for the discovery response.

In another embodiment, the procedure is also applicable to Common API Framework (CAPIF) architecture, where the API invoker or the CAPIF client (client function related to CAPIF on the UE) takes the role of the ASM client device (100) and the CAPIF Core Function (CCF) takes the role of the ASM server (200). The API invoker provides the service experience report for the API Exposing Function (AEF).

The Table (1) describes information elements in the Push service experience request from the ASM client device (100) to the ASM server (200).

TABLE 1

| Information element | Status | Description |
|---|---|---|
| VAL UE ID | Mandatory | Identify of the VAL UE triggering the Push service experience request. |
| VAL service ID | Optional | Identify of the VAL service. |
| VAL Server Id | Mandatory | Identify the VAL server for which the service experience report is sent |
| Timestamp | Optional | Time stamp of the collected report |
| VAL service experience report | Mandatory | Information related to VAL service experience. It may include end-to-end response time, connection bandwidth, request rate, VAL server availability, etc. |

Table (1) Push Service Experience Request

In another embodiment, the push service experience request from the EEC includes EECID as a VAL UE ID, EASID as a VAL Server ID and Table (2) as VAL service experience report.

TABLE 2

| Information element | Status | Description |
|---|---|---|
| Connection bandwidth | Optional | The actual connection bandwidth in Kbit/s for the application. |
| Request rate | Optional | The request rate to be generated by the AC. |
| Response time | Optional | Actual end-to-end response time. |
| Availability | Optional | Percentage of time the server is actually available for the AC's use. |
| Compute | Optional | The compute resources used by the AC. |
| Graphical Compute | Optional | The graphical compute resources used by the AC. |
| Memory | Optional | The memory resources used by the AC. |
| Storage | Optional | The storage resources used by the AC. |

Table (2) Service Experience (EAS Feedback) Report

Table (3) describes information elements in the push service experience response from the ASM server (200) to the ASM client device (100).

TABLE 3

| Information element | Status | Description |
|---|---|---|
| Required action | Optional | Corrective action required at the VAL UE side. |

Table (3) Push Service Experience Response

FIG. 5 illustrating a scenario of ASM server (200) pulls service experience report from the ASM client device (100), according to the embodiments as disclosed herein.

Referring to the FIG. 5 consider a proposed method, illustrates the high level procedure for the ASM server (200) to pull the service experience report from the ASM client device (100). The procedure can be initiated by the ASM server (200) upon receiving the push service experience request from the ASM client device (100) or upon receiving the request from application service provider (application server) to get the service experience report from the clients or any other event that requires the ASM server (200) to determine the service experience data. The steps are as follows:

1. The ASM server (200) sends the pull service experience request to the ASM client device (100). The request contains identity of the specific VAL server (300) for which the service experience report is required. The request includes the information elements as specified in Table (4).
2. Upon receiving the pull service experience request from the ASM server (200), the ASM client device (100) may take user consent to send the report if the user consent is not available already.
3. The ASM client device (100) sends the pull service experience response to the ASM server (200). The response contains service experience report and includes the information elements as specified in Table (5).
4. The ASM server (200) stores the service experience report in to the database or permanent storage.
5. The ASM server (200) may takes the corrective action as specified in step 3) of the Push service experience procedure.

In another embodiment, the procedure is also applicable to EDGEAPP architecture, where the Edge Enabler Client (EEC) takes the role of the ASM client device (100) and the Edge Enabler Server (EES) takes the role of the ASM server (200). The EES requests the EEC to send the service experience report for the Edge Application Server (EAS).

In another embodiment, the procedure is also applicable to CAPIF architecture, where the API invoker or CAPIF client (client function related to CAPIF on the UE) takes the role of the ASM client device (100) and the CAPIF Core Function (CCF) takes the role of the ASM server (200). The CCF requests the API invoker or CAPIF client to send the service experience report for the API Exposing Function (AEF).

Table (4) describes information elements in the Pull service experience request from the ASM server (200) to the ASM client device (100).

TABLE 4

| Information element | Status | Description |
|---|---|---|
| VAL Server Id | Mandatory | Identify the VAL server for which the service experience report is requested |
| VAL service ID | Optional | Identify of the VAL service. |

Table (4) Pull Service Experience Request

In another embodiment, the Pull service experience request from the EES includes EASID as a VAL Server ID.

TABLE 5

| Information element | Status | Description |
|---|---|---|
| Result | Mandatory | Indicates whether the report is available or not |
| VAL UE ID | Mandatory | Identify of the VAL UE |
| VAL service ID | Optional | Identify of the VAL service. |
| VAL Server Id | Mandatory | Identify the VAL server for which the service experience report is sent |
| Timestamp | Optional | Time stamp of the collected report |
| VAL service experience report | Optional | Information related to VAL service experience. It may include end-to-end response time, connection bandwidth, request rate, VAL server availability, etc. |

These IEs are included only if the result is success.

Table (5) Pull Service Experience Response

Table (5) describes information elements in the Pull service experience response from the ASM client device (100) to the ASM server (200).

In another embodiment, the Pull service experience response from the EEC includes EECID as a VAL UE ID, EASID as a VAL Server ID and Table (2) as VAL service experience report.

FIG. 6 illustrating a scenario of the ASM server (200) configures triggers to send service experience report to the ASM client device (100), according to the embodiments as disclosed herein.

Referring to the FIG. 6 consider a proposed method, illustrates the high level procedure for the ASM server (200) to configure triggers to the ASM client (100) to send the service experience report. The procedure can be initiated by the ASM server (200) upon receiving a request from application service provider to get the service experience report from the clients on specific event or any other event which requires the ASM server (200) to get service experience data. The steps are as follows:

1. The ASM server (200) sends the configure service experience report trigger request to the ASM client device (100). The request contains identity of the specific VAL server(s) (300) for which the service experience report is required. The request includes the information elements as specified in Table (6).
2. Upon receiving the Configure service experience report trigger request from the ASM server (200), the ASM client device (100) stores the triggering criteria for sending service experience report and may take user consent to send the report if the user consent is not available already.
3. The ASM client device (100) sends the Configure service experience report trigger response to the ASM server (200). The response includes the information elements as specified in Table (7).

In another embodiment, the procedure is also applicable to EDGEAPP architecture, where the Edge Enabler Client (EEC) takes the role of the ASM client device (100) and the Edge Enabler Server (EES) takes the role of the ASM server (200). The EES configures triggers to the EEC to send the service experience report for the Edge Application Server (EAS).

In another embodiment, the EES sends the triggers in the EAS discovery response message or in the EAS discovery notification message to the EEC to send the service experience report for the Edge Application Server (EAS).

In another embodiment, the EES sends the common triggering criteria, applicable to all EAS(es) on which the service experience is monitored for the VAL servers (300), in EEC registration response message.

In another embodiment, the procedure is also applicable to CAPIF architecture, where the API invoker or CAPIF client (client function related to CAPIF on the UE) takes the role of the ASM client device (100) and the CAPIF Core Function (CCF) takes the role off the ASM server (200). The CCF configures triggers to the API invoker function or CAPIF client to send the service experience report for the API Exposing Function (AEF).

TABLE 6

| Information element | Status | Description |
|---|---|---|
| VAL Server specific criteria | Mandatory | Identify the list of VAL servers for which the service experience report is requestedList of VAL server specific criteria |
| VAL Server Id | Mandatory | Identity of the VAL server |
| Triggering Criteria | Mandatory | Information about the triggers on which the service experience is monitored for the VAL server |
| Common Triggering criteria | Optional | Information about the triggers (applicable to all VAL servers) on which the service experience is monitored |
| Service experience measurement to monitor | Optional | Information about the service experience measurements which needs to be monitored and included in the report. If not present, by default end-to-end response time is measured. |
| Notification Target Address | Optional | The Notification target address (e.g. URL) where the notifications destined for the ASM Server should be sent to. |

Table (6) Configure Service Experience Report Trigger Request

The Table (6) describes information elements in the Configure service experience report trigger request from the ASM server (200) to the ASM client device (100).

In another embodiment, the Configure service experience report trigger request from the EES includes EAS specific criteria as list of a VAL Server specific criteria, EASID as a VAL Server Id and Table (2) as Service experience measurement to monitor. Further, the EES may not include Common Triggering criteria applicable to all EAS(es).

Table (7) describes information elements in the Configure service experience report trigger response from the ASM client device (100) to the ASM server (200).

TABLE 7

| Information element | Status | Description |
|---|---|---|
| Result | Mandatory | Result of the operation |

Table (7) Configure Service Experience Report Trigger Response

FIG. 7 illustrating a scenario of ASM client device (100) sends service experience report to the ASM server (200), according to the embodiments as disclosed herein.

Referring to the FIG. 7 consider a proposed method, illustrates the high level procedure for ASM client device (100) to send the service experience report to the ASM server (200) based on configured event/criteria. The steps are as follows:

1. The ASM client device (100) detected the occurrence of the event which has been either pre-configured or explicitly configured.
2. The ASM client device (100) sends Service experience report/notification to the ASM server (200). The request contains service experience report about VAL server(s) (300) and includes the information elements as specified in Table (8).
3. Upon receiving the Service experience report/notification from the ASM client device (100), the ASM server (200) stores the report in to the database or permanent storage.
4. The ASM server (200) may takes the corrective action as specified in step 3) of the Push service experience procedure.
5. The ASM server (200) may send the service experience report notification acknowledgement to the ASM client device (100).

In another embodiment, the ASM client device (100) sends the service experience report to the ASM server (200) using push service experience procedure.

In another embodiment, the procedure is also applicable to EDGEAPP architecture, where the Edge Enabler Client (EEC) takes the role of the ASM client device (100) and the Edge Enabler Server (EES) takes the role of the ASM server (200). The EEC sends the service experience report to the EES based on configured event/criteria for the Edge Application Server (EAS).

In another embodiment, the procedure is also applicable to CAPIF architecture, where the API invoker or CAPIF client (client function related to CAPIF on the UE) takes the role of the ASM client device (100) and the CAPIF Core Function (CCF) takes the role of the ASM server (200). The API invoker sends the service experience report to the CCF based on configured event/criteria.

The Table (8) describes information elements in the Service experience report/notification from the ASM client device (100) to the ASM server (200).

TABLE 8

| Information element | Status | Description |
|---|---|---|
| VAL UE ID | Mandatory | Identify of the VAL UE triggering the Push service experience request. |
| VAL service ID | Optional | Identify of the VAL service. |
| Timestamp | Optional | Time stamp of the collected report |
| Report | Mandatory | Service experience report per VAL server |
| VAL Server Id | Mandatory | Identify the VAL server for which the service experience report is sent |
| VAL service experience report | Mandatory | Information related to VAL service experience. It may include end-to-end response time, connection bandwidth, request rate, VAL server availability, etc. |

Table (8) Service Experience Report/Notification

In another embodiment, the Push service experience request from the EEC includes EECID as a VAL UE ID, EASID as a VAL Server ID and Table (2) as VAL service experience report.

The various actions, acts, blocks, steps, or the like in the flow charts (S200 and S300) may be performed in the order presented, in a different order or simultaneously. Further, in some embodiments, some of the actions, acts, blocks, steps, or the like may be omitted, added, modified, skipped, or the like without departing from the scope of the invention.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

The invention claimed is:

1. A method performed by a server for application service management in a wireless network, the method comprising:

receiving, from user user equipment (UE), a service experience report about a vertical application layer (VAL) server and at least one of a plurality of information elements;

determining whether to collect at least one additional service experience report from at least one other UE associated with the VAL server based on the received service experience report;

receiving, from the at least one other UE, the at least one additional service experience report based on a determination to collect the at least one additional service experience report;

analyzing the service experience report received from the UE and the at least one additional service experience report received from the at least one other UE; and performing at least one action based on the analysis.

2. The method of claim 1, wherein the analyzing comprises:

determining an entity producing problem between the UE and the VAL server, wherein the problem is associated with the service experience.

3. The method of claim 1, wherein the plurality of information elements comprises at least one of a VAL user equipment (UE) identifier (ID), a VAL service ID, a VAL server ID, or a time stamp of the service experience report, and wherein the service experience report comprises information related to at least one of an end-to-end response time, a connection bandwidth, a request rate, or a VAL server availability.

4. The method of claim 1, wherein the UE determines to transmit the service experience report based on at least one of a VAL client request or a configured triggering event.

5. The method of claim 1, further comprising:

transmitting, to UE, a pull service experience request; and receiving, from the UE, a pull service experience request including a result indicating whether the report is available or not.

6. A method performed by a user equipment (UE) for application service management in a wireless network, the method comprising:

receiving, from a server, a service experience request including a vertical application layer (VAL) server identifier (ID) identifying a VAL server;

receiving user consent to transmit a service experience report to the server in case that the user consent is not available; and transmitting, to the server, a service experience report about the VAL server and at least one of a plurality of information elements.

7. The method of claim 6, wherein the plurality of information elements comprises a result indicating whether the service experience report is available or not, wherein in case that the result indicates the service experience report is available, the plurality of information elements further comprises at least one of a VAL user equipment (UE) ID, a VAL service ID, a VAL server ID or a time stamp of the service experience repot, and wherein the service experience report comprises information related to at least one of an end-to-end response time, a connection bandwidth, a request rate or a VAL server availability.

8. The method of claim 6, further comprising:

determining to transmit the service experience report based on at least one of a VAL client request or a configured triggering event.

9. The method of claim 1, wherein the UE includes a client associated with the server for application service management.

10. The method of claim 6, wherein the method is performed by a client in the UE, wherein the client is associated with the server for application service management.

* * * * *